US008390219B2

(12) United States Patent
Houser

(10) Patent No.: US 8,390,219 B2
(45) Date of Patent: Mar. 5, 2013

(54) DOOR OPERATOR WITH ELECTRICAL BACK CHECK FEATURE

(75) Inventor: Blue Houser, Edgemoor, SC (US)

(73) Assignee: Yale Security Inc., Monroe, NC (US)

( * ) Notice: Subject to any disclaimer, the term of this patent is extended or adjusted under 35 U.S.C. 154(b) by 288 days.

(21) Appl. No.: 12/845,973

(22) Filed: Jul. 29, 2010

(65) Prior Publication Data

US 2012/0029701 A1 Feb. 2, 2012

(51) Int. Cl.
*H02P 1/00* (2006.01)
*H02P 3/00* (2006.01)
*H02P 5/00* (2006.01)

(52) U.S. Cl. ........ 318/255; 318/256; 318/265; 318/266; 318/400.37; 318/400.38; 318/400.39; 318/282; 318/285; 49/118; 49/122; 49/138; 49/139; 49/349

(58) Field of Classification Search .................. 318/255, 318/256, 265, 266, 400.37–400.39, 282, 318/285, 286; 49/118, 122, 138, 139, 349
See application file for complete search history.

(56) References Cited

U.S. PATENT DOCUMENTS

| | | | |
|---|---|---|---|
| 581,972 | A | 5/1897 | Wright |
| 618,053 | A | 1/1899 | Brown |
| 2,138,521 | A | 11/1938 | Ellis |
| 2,639,142 | A | 5/1953 | Morgan et al. |
| 2,758,835 | A | 8/1956 | Wikkerink |
| 2,843,376 | A | 7/1958 | Osuch et al. |
| 2,924,449 | A | 2/1960 | Leimer et al. |
| 3,059,485 | A | 10/1962 | Bohlman et al. |
| 3,114,541 | A | 12/1963 | Coffey |
| 3,195,879 | A | 7/1965 | Bond et al. |
| 3,268,944 | A | 8/1966 | Sanchez |
| 3,284,950 | A | 11/1966 | Gute |

(Continued)

FOREIGN PATENT DOCUMENTS

| | | |
|---|---|---|
| CH | 690370 A5 | 8/2000 |
| DE | 20218327 | 5/2004 |

(Continued)

OTHER PUBLICATIONS

Yale Security, Inc., International Patent Application No. PCT/US2005/023398, International Search Report and Written Opinion, Aug. 20, 2007.

(Continued)

*Primary Examiner* — Walter Benson
*Assistant Examiner* — Erick Glass
(74) *Attorney, Agent, or Firm* — Steven B. Phillips; Moore & Van Allen PLLC

(57) ABSTRACT

A door operator with an electrical back check feature is disclosed. Embodiments of the present invention are realized by a motorized door operator that electrically creates a back check force for an opening door. The door operator simulates the back check normally created by hydraulic means in convention door closers, but without the use of pistons, springs or hydraulic fluid. The door operator includes a motor disposed to operatively connect to a door so that the door will open when the motor moves, and a position sensor to determine a position of the door. A processor is programmed to exert a closing force on the door in the back check region. In some embodiments, the closing force is exerted by injecting a voltage into the electric motor of the door operator.

10 Claims, 7 Drawing Sheets

U.S. PATENT DOCUMENTS

| | | | |
|---|---|---|---|
| 3,449,789 | A | 6/1969 | Russell et al. |
| 3,470,653 | A | 10/1969 | Kalog |
| 3,560,950 | A | 2/1971 | Peters |
| 3,609,390 | A | 9/1971 | Feldman |
| 3,719,005 | A | 3/1973 | Carli |
| 3,777,423 | A | 12/1973 | Coulter et al. |
| 3,874,117 | A | 4/1975 | Boehm |
| 3,886,425 | A | 5/1975 | Weiss |
| 3,955,661 | A | 5/1976 | Popper et al. |
| 4,045,914 | A | 9/1977 | Catlett |
| 4,161,183 | A | 7/1979 | Berry |
| 4,220,051 | A | 9/1980 | Catlett |
| 4,222,147 | A | 9/1980 | Burnett, Jr. |
| 4,267,619 | A | 5/1981 | Suska |
| 4,285,094 | A | 8/1981 | Levings, Jr. |
| 4,289,995 | A | 9/1981 | Sorber et al. |
| 4,330,958 | A | 5/1982 | Richmond |
| 4,333,270 | A | 6/1982 | Catlett |
| 4,334,161 | A | 6/1982 | Carli |
| 4,342,354 | A | 8/1982 | Leivenzon et al. |
| 4,348,835 | A | 9/1982 | Jones et al. |
| 4,429,490 | A | 2/1984 | Zunkel |
| 4,472,910 | A | 9/1984 | Iha |
| 4,498,033 | A | 2/1985 | Aihara et al. |
| 4,501,090 | A | 2/1985 | Yoshida et al. |
| 4,553,656 | A | 11/1985 | Lense |
| 4,563,625 | A | 1/1986 | Kornbrekke et al. |
| 4,573,238 | A | 3/1986 | Phillips |
| 4,644,693 | A | 2/1987 | Wang |
| 4,658,545 | A | 4/1987 | Ingham et al. |
| 4,660,324 | A | 4/1987 | Nyenbrink |
| 4,669,218 | A | 6/1987 | Kornbrekke et al. |
| 4,727,679 | A | 3/1988 | Kornbrekke et al. |
| 4,836,345 | A | 6/1989 | Anderson |
| 4,852,706 | A | 8/1989 | Pietrzak et al. |
| 4,945,678 | A | 8/1990 | Berner et al. |
| 4,952,080 | A | 8/1990 | Boiucaner et al. |
| 4,966,266 | A | 10/1990 | Yamada et al. |
| 4,972,629 | A | 11/1990 | Merendino et al. |
| 4,995,194 | A | 2/1991 | Schultze et al. |
| 4,999,551 | A | 3/1991 | Yoshida et al. |
| 5,018,304 | A | 5/1991 | Longoria |
| 5,024,124 | A | 6/1991 | Popov et al. |
| 5,040,331 | A | 8/1991 | Merendino et al. |
| 5,095,654 | A | 3/1992 | Eccleston |
| 5,218,282 | A | 6/1993 | Duhame |
| 5,221,239 | A | 6/1993 | Catlett |
| 5,222,327 | A | 6/1993 | Fellows et al. |
| 5,278,480 | A | 1/1994 | Murray |
| 5,375,374 | A | 12/1994 | Rohroff, Sr. |
| 5,502,874 | A | 4/1996 | Lucas |
| 5,507,120 | A | 4/1996 | Current |
| 5,513,467 | A | 5/1996 | Current et al. |
| 5,634,296 | A | 6/1997 | Hebda |
| 5,634,298 | A | 6/1997 | Slopack |
| 5,687,507 | A | 11/1997 | Beran |
| 5,698,073 | A | 12/1997 | Vincenzi |
| 5,752,344 | A | 5/1998 | Richmond |
| 5,770,934 | A | 6/1998 | Theile |
| 5,808,654 | A | 9/1998 | Loos |
| 5,828,302 | A | 10/1998 | Tsutsumi et al. |
| 5,878,530 | A | 3/1999 | Eccleston et al. |
| 5,881,497 | A | 3/1999 | Borgardt |
| 5,910,075 | A | 6/1999 | Arnell et al. |
| 5,913,763 | A | 6/1999 | Beran et al. |
| 5,930,954 | A | 8/1999 | Hebda |
| 5,956,249 | A | 9/1999 | Beran et al. |
| 5,963,000 | A | 10/1999 | Tsutsumi et al. |
| 5,987,818 | A | 11/1999 | Dabideen |
| 6,002,217 | A | 12/1999 | Stevens et al. |
| 6,006,475 | A | 12/1999 | Schwantes et al. |
| 6,067,753 | A | 5/2000 | Hebda |
| 6,108,975 | A | 8/2000 | Bailey |
| 6,185,773 | B1 | 2/2001 | Goedde |
| 6,223,469 | B1 | 5/2001 | Moll |
| 6,316,892 | B1 | 11/2001 | Valencia |
| 6,318,196 | B1 | 11/2001 | Chang |
| 6,343,437 | B1 | 2/2002 | Hoffmann et al. |
| 6,347,485 | B1 | 2/2002 | Hebda |
| 6,357,805 | B1 | 3/2002 | Hebda |
| 6,430,871 | B1 | 8/2002 | Hebda |
| 6,481,160 | B1 | 11/2002 | Kowalczyk |
| 6,493,904 | B1 | 12/2002 | Chiang |
| 6,553,717 | B2 | 4/2003 | St. John et al. |
| 6,588,153 | B1 | 7/2003 | Kowalczyk |
| 6,634,140 | B1 | 10/2003 | Sellman |
| 6,640,494 | B2 | 11/2003 | Hormann |
| 6,678,999 | B2 | 1/2004 | Zeungguang et al. |
| 6,751,909 | B2 * | 6/2004 | Ranaudo ........................ 49/506 |
| 6,883,275 | B2 | 4/2005 | Hellinga et al. |
| 6,891,479 | B1 | 5/2005 | Eccleston |
| 7,068,179 | B2 | 6/2006 | Snell et al. |
| 7,170,248 | B2 | 1/2007 | Tsui et al. |
| 7,234,201 | B2 | 6/2007 | Brown et al. |
| 7,296,380 | B2 | 11/2007 | Backman |
| 7,316,096 | B2 | 1/2008 | Houser et al. |
| 7,324,894 | B2 | 1/2008 | Urman et al. |
| 7,418,800 | B1 | 9/2008 | Sellman |
| 2002/0092237 | A1 | 7/2002 | Hebda |
| 2003/0057905 | A1 | 3/2003 | Fitzgibbon |
| 2003/0204935 | A1 | 11/2003 | Kim |
| 2004/0035057 | A1 | 2/2004 | Backman |
| 2004/0251868 | A1 | 12/2004 | Sato et al. |
| 2005/0073425 | A1 | 4/2005 | Snell et al. |
| 2005/0091928 | A1 | 5/2005 | Okulov et al. |
| 2006/0021189 | A1 | 2/2006 | Johnson |
| 2006/0090400 | A1 | 5/2006 | Los et al. |
| 2006/0191204 | A1 | 8/2006 | Herwig et al. |
| 2006/0197481 | A1 | 9/2006 | Hotto et al. |
| 2006/0242908 | A1 | 11/2006 | McKinney |
| 2006/0244271 | A1 | 11/2006 | Hass |
| 2008/0115543 | A1 | 5/2008 | Lanigan et al. |
| 2009/0265992 | A1 | 10/2009 | Hass et al. |
| 2009/0300988 | A1 | 12/2009 | Bem |
| 2010/0115853 | A1 * | 5/2010 | Gebhart et al. ................ 49/506 |

FOREIGN PATENT DOCUMENTS

| | | |
|---|---|---|
| JP | 1296399 | 11/1989 |
| JP | 4131488 | 5/1992 |
| JP | 6033994 | 2/1994 |
| JP | 11324483 | 11/1999 |
| JP | 2009270278 | 11/2009 |

OTHER PUBLICATIONS

Yale Security, Inc., International Patent Application No. PCT/US2005/023398, International Preliminary Report on Patentability, Sep. 20, 2007.

Sky Link, Add Remote Control to any Swinging Door, www.smarthome.com/73105/Swing-Door-Opener-w-Electric-Strike-Automatic-Door-Security/p.aspx, 3 pages, visited May 13, 2010.

JPM Security Systems, Wheelchair Accessible Door/Window Access Systems for Disabled or Elderly People, www.jpmsecurity.ie/index.php?page=disabled-door-access, 2 pages, visited May 13, 2010.

Nabco,Ltd., Nabco Entrances Swing Doors, www.floridadoorcontrol.com/nabco_swing_doors.htm, 3 pages, visited on Oct. 7, 2009.

The Stanley Works, Swing Door Systems, www.stanleyaccesstechnologies.com/products/lit/Swing%20Door%20Series%20AT9706.pdf, 4 pages, visited on or about Oct. 7, 2009.

Product Review, Home & Garden, Garage Door Operators, Boss BS1, www.productreview.com.au, 1 page, visited on or about Jun. 17, 2009.

Christy Commercial Hardware, Jackson Closers, www.christyhardware.com, 1 page, visited on or about Jun. 17, 2009.

Houser, et al., U.S. Appl. No. 12/603,871, filed Oct. 22, 2009.

Yale Security Inc., International Application No. PCT/US2011/045721, International Search Report and Written Opinion, Nov. 7, 2011.

* cited by examiner

DOOR OPERATOR WITH ELECTRICAL BACK CHECK FEATURE

BACKGROUND

Automatic door operators are used on public buildings and residences to allow for access by the physically disabled or where manual operation of the door may be inconvenient to users. The purpose of a door operator is to open and possibly close a door. A variety of electro-mechanical automatic door operators are known. A typical door operator includes an electric motor and a linkage assembly for operatively coupling the drive shaft of the motor to a door so that the door will be opened and closed when the drive shaft rotates. Activation of the door operator is initiated by means of an electric signal generated in a variety of ways such as, for example, a pressure switch, an ultrasonic or photoelectric presence sensor, motion sensors, radio transmitters, wall switches, and the like. The door may then be closed by the operator motor or with a door closer. Many door closers are mechanically actuated and have a plurality of valves and springs for controlling the varying amounts of force applied to close the door as a function of door angle.

Some door operator systems are provided with clutch mechanisms between the motor and the linkage assembly that enable the door to be moved freely under manual power. Door operators with clutch mechanisms may provide some level of safety when objects are in the door's pathway of movement. Various clutch mechanisms decouple powered opening systems during the closing cycle, which is particularly necessary in the event of an interruption of power supply or when an obstacle is encountered.

When a door operator with a clutch mechanism is used with a mechanical door closer, the features of both a door operator and a full-featured door closer can be available to users of the door. As an example, the automatic opening available with a door operator is available, but in addition, varying amounts of force can be applied to the door by the door closer. Many door closers are designed to apply varying forces to a door as a function of the door angle (i.e., the angle at which the door is open). In this regard, when the door is first opened under manual operation, the door closer is designed to generate a relatively small force, which tends to push the door closed, so that the door closer does not generate significant resistance to the user's efforts to open the door. Many door closers are designed to provide a significant resistive force when the door is pushed open beyond a specific angle, for example, 60 to 70 degrees. This high-force region of operation of the door is often referred to as the "back check" region, and the high force is intended to prevent the back of the door from hitting a wall or stop, possibly causing damage.

SUMMARY

Embodiments of the present invention are realized by a motorized door operator that electrically creates a back check for an opening door. The door operator according to embodiments of the present invention simulates the back check normally created by hydraulic means in a conventional door closer, but without the use of pistons, springs or hydraulic fluid. The back check force in embodiments of the invention is created by electrical control of the motor.

A door operator according to example embodiments of the invention includes a motor disposed to operatively connect to a door so that the door will open when the motor moves, and a position sensor to determine a position of the door. A memory and a processor are also included, wherein the processor is operatively connected to the motor, the position sensor and the memory. The processor is programmed, for example, by information stored in the memory, to carry out a method of operating the door operator including determining that the door to which the door operator is attached is opening through a back check region, and electronically controlling the electric motor to exert a closing force on the door. In some embodiments, the closing force is maintained until the door comes to a stop. This "back check" force is created by electrical signals sent to the motor.

In some embodiments, the processor can also determine if a door is being pushed open and prevent the electric motor from opening the door, either before, or concurrently with exerting the closing force on the door in the back check region. In some embodiments, the closing force is exerted by injecting a voltage into the electric motor of the door operator. In some embodiments, this voltage is of the same polarity as the voltage used to close the door where the door operator is also operative to close the door. In some embodiments, the level of the voltage is controlled by a potentiometer operatively connected to the controller. Such a potentiometer, as well as other components such as switches, can provide the means to adjust various operating parameters of the door operator.

In some embodiments, the processor determines the position of a door by sensing the proximity of a magnet. In some embodiments, this position sensing is accomplished by a position sensor such as a Hall effect device or Hall effect sensor. In some embodiments, the door operator includes a wall switch by which a user can selectively operate the door operator. The position sensor and switch are connected to a control unit which includes the processor. The control unit together with any sensors, input devices and the like form a control system for the door operator and provide the means to control the motor, and the door operator in general.

In some embodiments, the drive shaft of the motor is operatively connected to an output shaft. A clutch assembly can be mounted to the output shaft and conditionally, operatively engage a rotatable operator arm that can be operatively connected to the door. The clutch assembly in part enables the motor to be disengaged if a user manually opens the door, and if the user manually closes the door in an embodiment where the door operator motor is enabled to both open and close the door. The motor and any components necessary to operatively couple the motor to the door can form the means of opening the door.

DETAILED DESCRIPTION

The following detailed description of embodiments refers to the accompanying drawings, which illustrate specific embodiments of the invention. Other embodiments having different structures and operation do not depart from the scope of the present invention.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise.

As used herein, the term "open position" for a door means a door position other than a fully closed position, including any position between the fully closed position and a fully open position as limited only by structure around the door frame, which can be up to 180° from the closed position.

Figure 1:
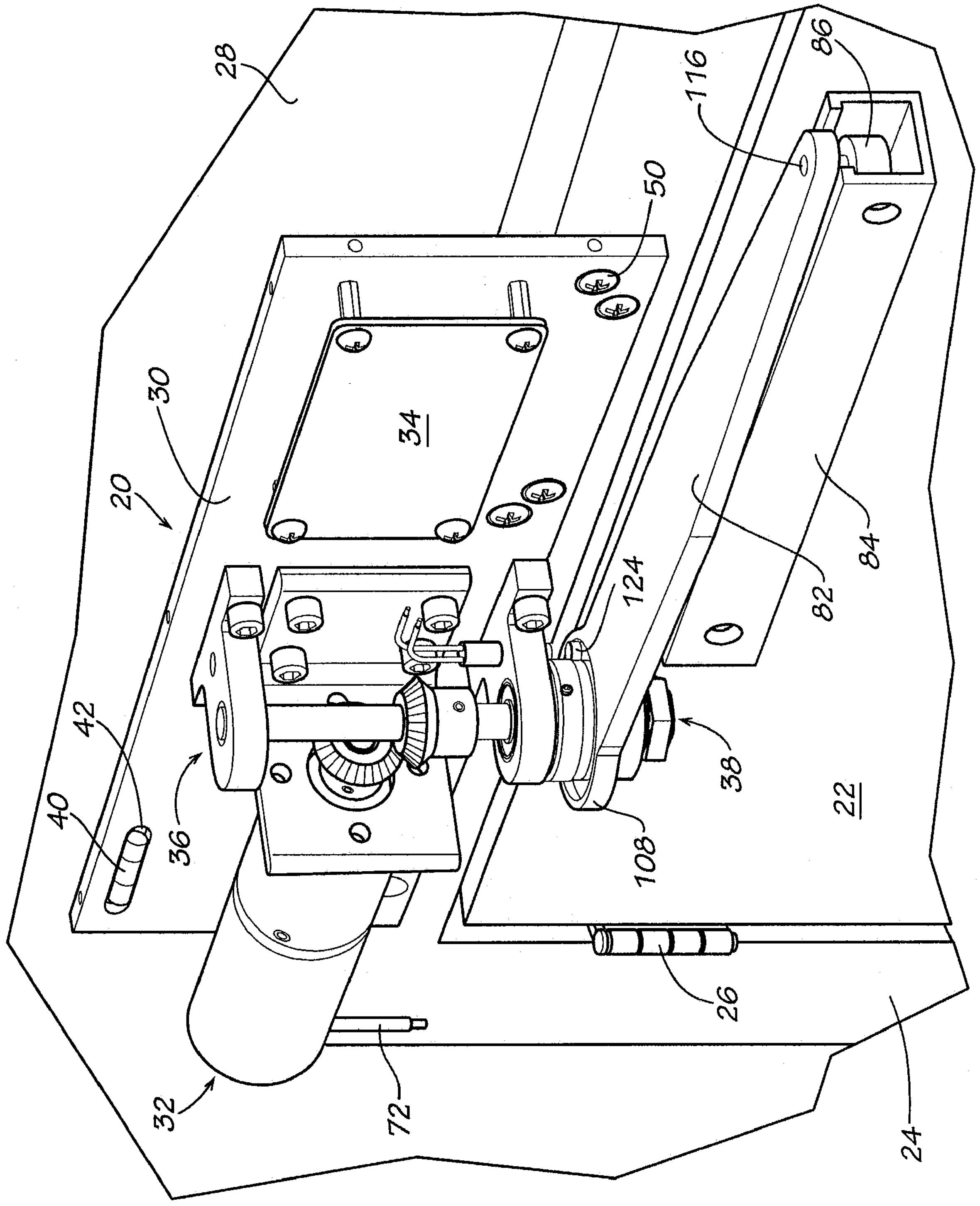
FIG. 1 is a perspective view of an installed, automatic, motorized door operator according to one embodiment of the present invention. In the illustration in FIG. 1, the door is in the fully-closed position.

Referring now to the drawings, wherein like reference numerals designate corresponding or similar elements throughout the several views, an embodiment of a door operator is shown in FIG. 1, and is generally designated at 20. The door operator 20 is mounted adjacent to a door 22 in a door frame 24 for movement of the door 22 relative to the frame 24 between a closed position and an open position. For the purpose of this description, only the upper portion of the door 22 and the door frame 24 are shown. The door 22 is of a conventional type and is pivotally mounted to the frame 24 for movement from the closed position, as shown in FIG. 1, to an open position for opening and closing an opening through a building wall 28 to allow a user to travel from one side of the wall 28 to the other side of the wall 28.

Continuing with FIG. 1, the door operator 20 includes a back plate 30, a motor assembly 32, a control unit 34, and an operator arm assembly 36 for operably coupling the door operator 20 to a door 22 and including a clutch assembly 38. The orientation of the door 22 and door operator 20 is a pull side configuration, in which the operator arm assembly 36 pulls the door 22 open towards the same side on which the door operator 20 and hinges 26 are disposed. Alternatively, the orientation could be a push side configuration, in which the operator arm assembly may include a linkage of, for example, two arm links to permit the door operator 20 to push the door 22 open in the direction away from the side of the door 22 on which the door operator 20 is located, as is known in the art.

The back plate 30 in FIG. 1 is securely mounted to the upper edge of the door frame 24 using mounting screws 50, or other fasteners. The back plate 30 extends generally horizontally with respect to the door frame 24. The motor assembly 32, operator arm assembly 36, and control unit 34 are mounted to the back plate 30. A bubble level 40 is also mounted to the back plate 30, and may therefore be integral to the back plate 30, to assist an installer in mounting the back plate 30 to the door frame 24 or surrounding structure horizontally. The level 40 may be attached to the back plate 30 with fasteners or adhesive, and a recess 42 may be machined into the back plate 30 to receive the level 40. An installer may use the integral level 40 to adjust the back plate 30 such that the level 40 is "level" before mounting the back plate 40 to the door frame 24. The level 40 may be considered "level," for example, when the bubble indicates that the level 40 is substantially or completely horizontal (as shown in FIG. 1) or vertical, if the level 40 is vertically oriented on the back plate 30.

Still referring to FIG. 1, a cover (not shown) may be attached to the back plate 30 to surround and enclose the components of the door operator 20 that are within the limits of the back plate 30 to reduce dirt and dust contamination, and to provide a more aesthetically pleasing appearance. It is understood that although the back plate 30 is shown mounted directly to the door frame 24, the back plate 30 could be mounted to the wall 28 adjacent the door frame 24, concealed within the wall 28 or door frame 24, or mounted to the door 22 with the operator arm assembly 36 mounted to the door frame.

Figure 2:
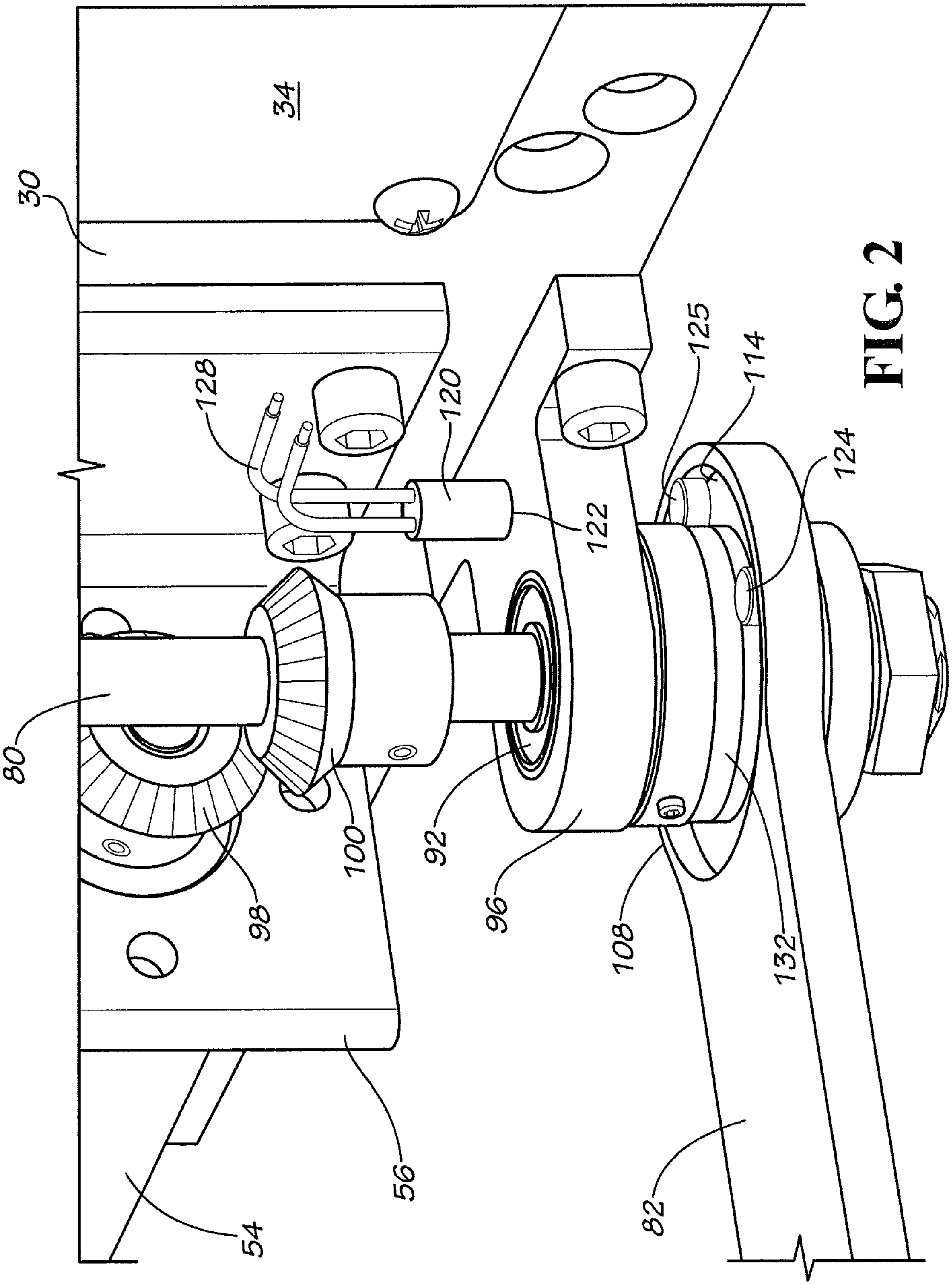
FIG. 2 is an enlarged perspective view of the door operator of FIG. 1 where the door is in a fully-opened position.

Referring now to FIG. 1 and FIG. 2, the motor assembly 32 includes an electric motor and a gear train 54, which may include a planetary gear, mounted to the back plate 30 with a mounting bracket 56. The motor is a three-phase AC electric reversible motor with a motor drive shaft (not shown). A portion of the drive shaft extends from the housing of the motor. The motor is reversible such that the rotation of the motor in one direction will cause the drive shaft to rotate in one direction and rotation of the motor in the opposite direction will cause the drive shaft to rotate in the opposite direction. A suitable motor for use in the door operator 20 is available from Brother of Somerset, N.J., as model no. BHLM15L-240TC2N, which is a 240 volt motor providing 1/50 HP and a gear ratio of 240:1.

It will be understood by those skilled in the art that the electric motor may be selected and sized according to the dimensions and weight of the hinged door 22, and may include a gear train 54 disposed within a casing and include a gear train input shaft (not shown) coupled to the drive shaft of the motor. An intermediate shaft that is the output of the gear train 54 is coupled to the gear train input shaft. The gear train 54 may provide a proper reduction in output drive of the motor necessary to move the hinged door 22 at an appropriate speed. The control unit 34 regulates the operation of the motor and thus regulates the opening and closing of the door 22. The control unit 34 is in communication with the motor, which is adapted to receive signals from the control unit 34. The control unit 34 will be further described below with reference to FIG. 5. In addition to the electrical back check feature discussed herein, the control unit 34 may also function to maintain the door 22 in an open position for a selected period of time for enabling a person to pass through the door opening. The amount of time that the door 22 is held open may be varied and can be programmed into the control unit 34 at the time of installation, or altered at any time thereafter by reprogramming the control unit. The control unit 34 may also be adjusted to generate signals that control the speed of the motor for controlling the speed of opening the door 22. It is understood that although the control unit 34 is shown mounted to the back plate 30, the controller 34 could also be housed internally within the wall 28, a ceiling, or remotely, such as in a mechanical room, for example.

The control unit 34 is part of an overall control system which may include an input device in electrical communication with the control unit 34 for allowing a user to selectively control the delivery of electrical energy to the motor. The input device is operable to generate a door movement signal to the control unit 34 which, in turn, is responsive to receiving the door movement signal to control operation of the motor so as to selectively cause the motor to rotate the drive shaft and thereby affect powered opening of the door 22. The input device may be of any known or desired type. For example, the input device may consist of a manual push pad wall switch for being mounted on the wall, or a post, adjacent to the door 22. This arrangement is such that a user, such as, for example, a handicapped person wanting to pass through the door opening need only to press the push pad for sending a signal to the control unit 34 to open the door 22. Various other input devices are also suitable for use, including any type of switch, sensors and actuators, such as pressure pads as in a switch type floor mat and other mechanical switching devices, infrared motion sensors, radio frequency sensors, photoelectric cells, ultrasonic presence sensor switches, and the like. As a result of implementing some of these input devices, an automatically operable door may be caused to open by mere proximity of a person to the door. Such proximity may cause the door to operate by virtue of the interruption of a light beam, distortion of an electrical field, or by actual physical closing of the switch by contact with the person or in response to the weight of the person approaching the door. Consequently, the particular manner for generating a door movement signal to the control unit 34 for energizing the motor can be accomplished through any of various means.

It should be noted that when the term "input device" is used herein, the term is generally intended to refer to the device used to operate the door by a user on a day-to-day basis. The control unit of embodiments of the invention may receive other "input" from switches, potentiometers, and the like, where this input is designed to enable an installer, maintenance person, or the like to adjust the door operator. This input may include the setting of such parameters as hold-open torque, hold-open time, delay, etc.

Still referring to FIG. 1 and FIG. 2, an operator arm assembly is provided for applying opening and closing force to the door. The operator arm assembly includes an output shaft 80, an operator arm 82, a track 84, a roller 86 and the clutch assembly 38. The output shaft 80 is constrained to a vertical orientation by passing through bearings, such as bearing 92, that are disposed in openings in a bottom brace 96 and a similar top brace that are mounted to the back plate 30 with bolts. The output shaft 80 is coupled to an intermediate shaft with an intermediate shaft bevel gear 98, fixed to the end of the intermediate shaft, that engages an output shaft bevel gear 100 to translate the direction of rotation 90 degrees. A set screw secures the output shaft bevel gear 100 to the output shaft 80. However, it is anticipated that other forms of gearing and linkages may be used, such as worm gears, helical gears, rack and pinion arrangements and the like to translate the rotation 90 degrees. Alternative arrangements are feasible; for example, the orientation of the drive shaft and the output shaft 80 axes may be parallel or coaxial. The operator arm 82 is an elongated member that has one end that may be considered an arm hub 108, defining an opening in which a bearing is disposed, through which the output shaft 80 extends. An annular channel 114 surrounds the output shaft 80 at the arm hub 108. At the opposite end of the operator arm 82, the roller 86 is secured at an opening 116. The track 84 is mounted to the door 22, and the roller 86 rolls in the track 84 and may apply opening or closing force to the track 84 as the as the door 22 pivots.

In the embodiment shown, the bottom brace 96 also holds a door position sensor 120. As best seen in FIG. 2, the sensor 120, preferably an electro-magnetic detection device such as a reed switch, as shown, or a Hall effect sensor device, extends through an opening in the bottom brace 96 to be in close proximity to the annular channel 114 of the operator arm hub. Magnets 124, 125 are disposed in the annular channel 114. One magnet 124 is positioned to be under the sensor 120 when the door 22 is closed, while the other magnet 125 is positioned to be under the sensor 120 when the door 22 is fully open; the position of the magnets 124, 125 may be altered around the annular channel 114 to adjust these door positions. By sensing when a magnet 124 is in proximity, the sensor 120 indicates to the control unit 34 the status of the door position as closed, not closed, or fully open. The sensor 120 is in electrical communication with the control unit 34 by means of wires 128. The sensor 120 may indicate the door position status by either sending signals or not sending signals to the control unit 34 depending on the position of the door and magnets. The switch associated with the sensor 120 may be designed as either normally open or normally closed, operating by sending a signal to the control unit 34 when there is a change in the magnetic field from the normal position, i.e., when the sensor 120 is actuated by a magnet, either (1) sending a signal when in the presence of a magnetic field and not sending a signal when not in the presence of a magnetic field, or (2) sending a signal when in the presence of a magnetic field and sending a signal when not in the presence of a magnetic field. It will be understood by one of ordinary skill in the art that other sensor and switch technologies may be used to indicate door position; other switches that could be used include microswitches, limit switches, proximity switches, optical sensors, and the like.

When the control unit senses the "open" magnet approaching, the control unit creates a back check condition by quickly ramping the speed of the door down using voltage injection to the motor. For example, in some embodiments the control unit ramps the speed of the door down within about 50 milliseconds. The control unit then switches to the "hold-open" condition for the door operator. If the "hold-open torque" were adjusted to be very low, the door would feel like it is coasting beyond the open magnet. If the "hold-open torque" were adjusted to be very high it would be very hard to move the door at this point.

Figure 3:
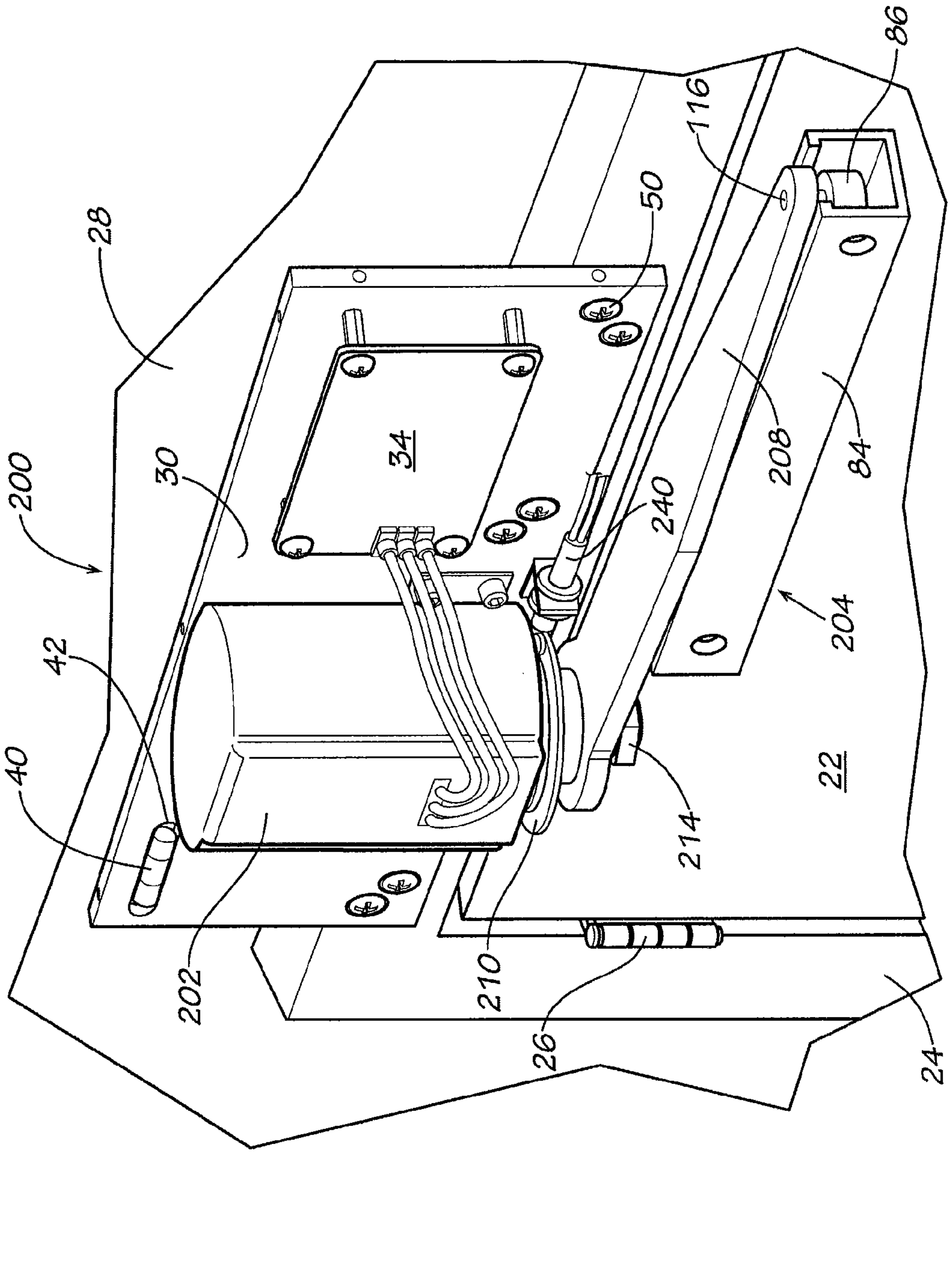
FIG. 3 is a perspective view of an installed, automatic, motorized door operator according to another embodiment of the present invention. In the illustration in FIG. 3, the door is in the fully-closed position.
Figure 4:
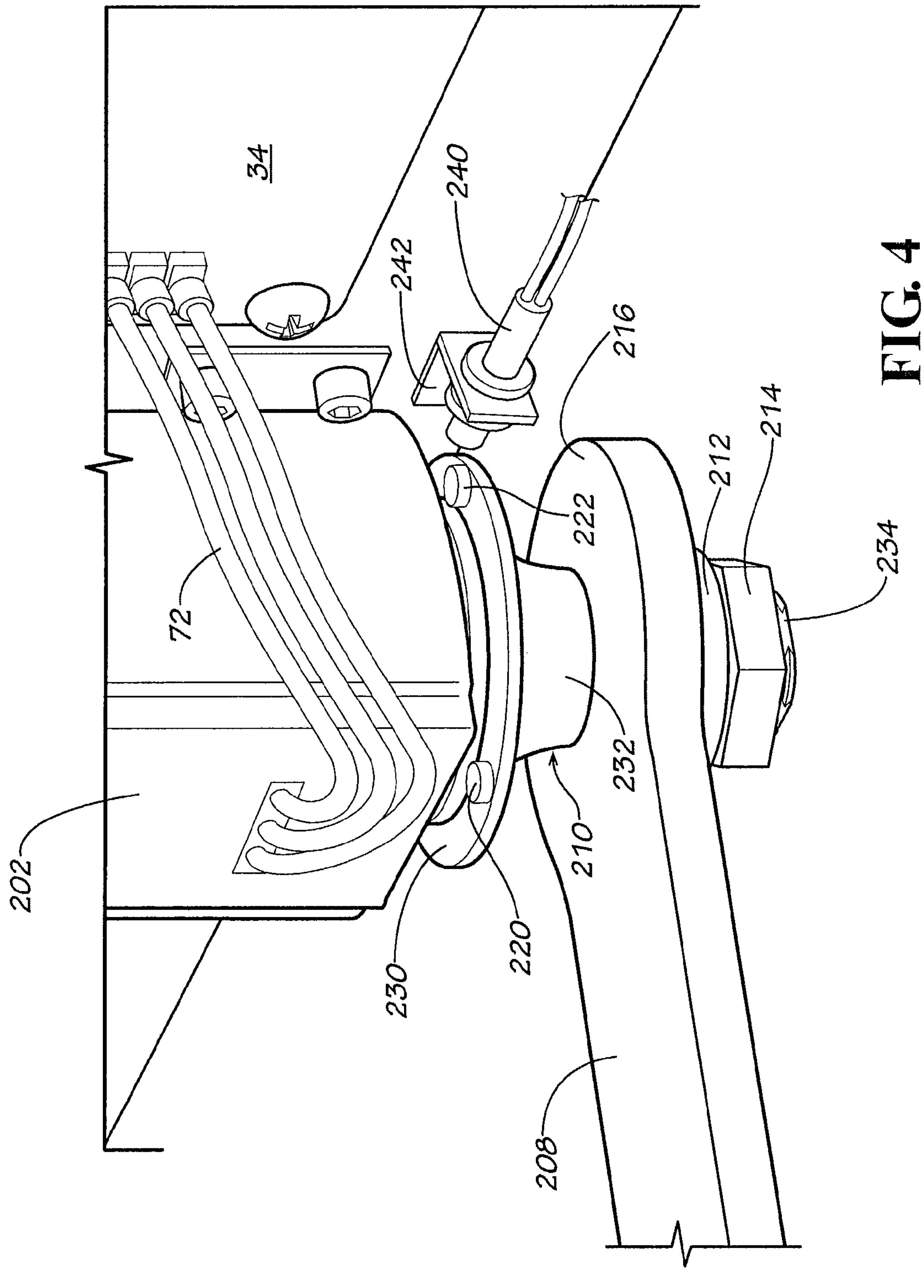
FIG. 4 is an enlarged perspective view of the door operator of FIG. 3 where the door is in a fully-opened position.

FIGS. 3 and 4 show another embodiment of a door operator 200. The door operator 200 includes a back plate 30, a motor 202, a controller 34, and an operator arm assembly 204. In this particular drawing for this embodiment of the door operator wires 72 can be seen interconnecting the controller and the motor. The motor may be selected by one of ordinary skill in the art, and in one embodiment may provide 1/75 HP and have a 200:1 gear ratio. The vertical orientation of the motor 202 eliminates the need that exists in the embodiment of FIGS. 1 and 2 to translate the direction of rotation of the motor shaft to the output shaft, and makes it possible to shorten the back plate 30 if desired. The motor shaft extends directly to the operator arm assembly 204.

The operator arm assembly 204 includes an operator arm 208, a track 82, a roller 86, a magnet holder 210, a washer 212, and a nut 214. The operator arm 208 has an arm hub 216 defining an opening through which the motor shaft and magnet holder 210 extend, and is similar to the operator arm 82 of FIGS. 1 and 2 but lacks an annular channel 114. Instead, magnets 220 and 222 may be disposed on the magnet holder 210, which includes an annular shelf 230 at one end, a tapered neck 232 beneath the annular shelf 230, and an externally threaded stem 234 extending from the neck 232. An axial cylindrical bore passes through the magnet holder 210, and an internal longitudinal channel, not shown, may be provided to mate with a key, also not shown, on the motor shaft, which consequently requires the magnet holder 210 to turn with the motor shaft without slipping. A set screw in a radial opening in the magnet holder 210 also secures the magnet holder 210 to the motor shaft. The magnet holder stem passes through the operator arm opening and the washer 212, and the nut 214 is threaded onto the stem 234 to secure the arm 208 to the magnet holder 210.

A door position sensor 240 is mounted to the back plate 30 with a bracket 242. The sensor 240 design and operation is similar to the sensor 120 of the door operator 20 of FIGS. 1 and 2, but the sensor 240 is mounted horizontally to detect the presence of the magnets 220 and 222 on the shelf 230 of the magnet holder 210. One magnet 220 is positioned to be in close proximity to the sensor 240 when the door 22 is closed, while the magnet 222 is positioned to be proximate to the sensor when the door 22 is fully open. The position of the magnets 220 and 222 may be altered around the shelf 230 to adjust these door positions. With the operator arm 208 in the closed position as in FIG. 3, the magnet 220 is proximate to the sensor 230; with the operator arm 208 in the fully open position as in FIG. 4, the magnet 222 is proximate to the sensor 230. In the illustrated embodiment of FIG. 4, back check begins as soon as the controller begins to sense the proximity of the "open" magnet as previously described. It should be noted that in an alternate embodiment, additional magnets could be placed on the shelf to indicate other door positions such as the start of the back check region of the swing.

Figure 5:
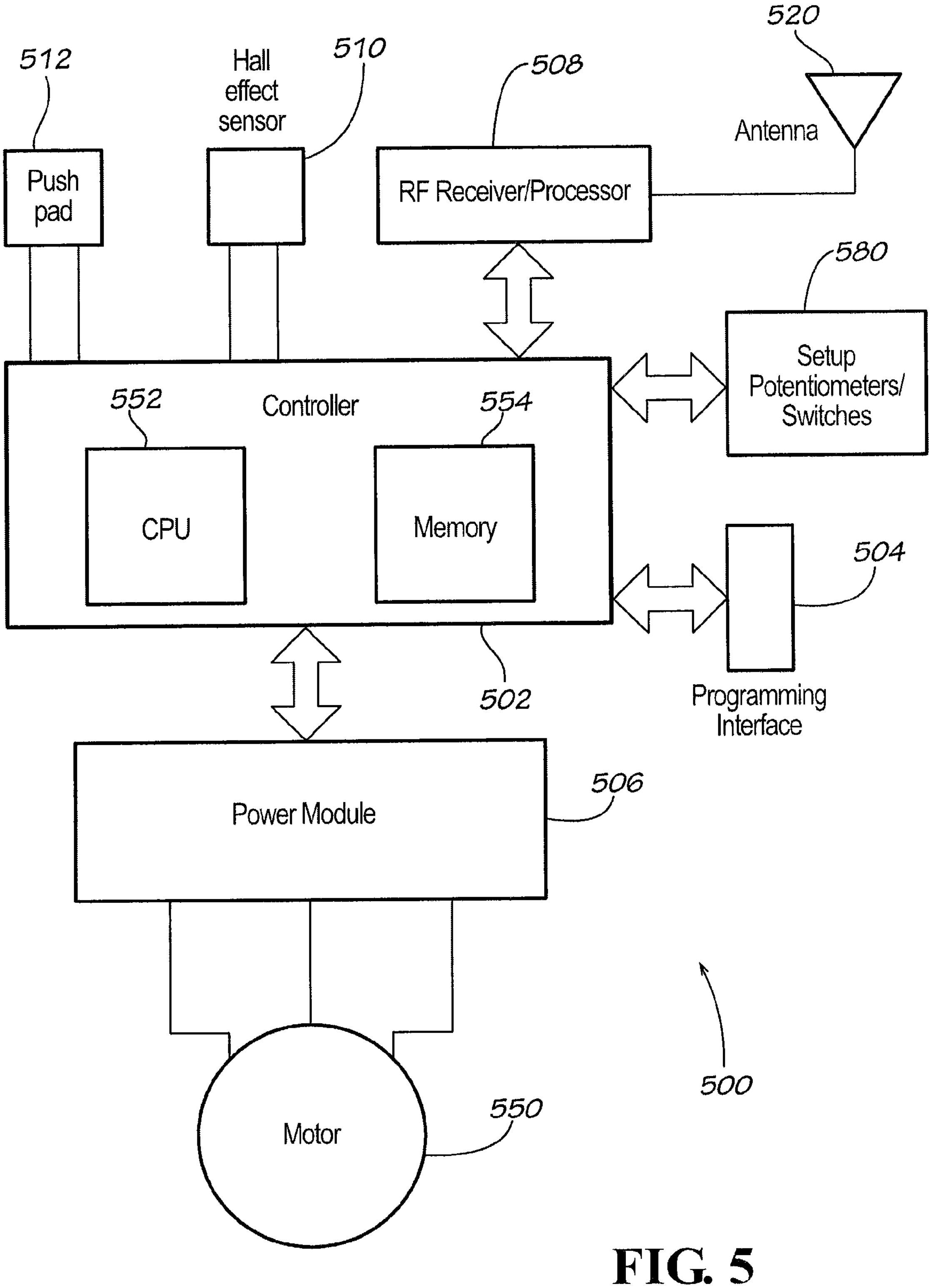
FIG. 5 is a schematic, block diagram of the electronic control system of a door operator according to example embodiments of the present invention.

FIG. 5 shows a control system, 500, that can be used with a door operator according to embodiments of the present invention. Control system 500 includes controller 502, programming interface 504, power module 506, and optionally, radio receiver/processor 508. In example embodiments, these components are part of control unit 34 illustrated in the previous figures. Hall effect sensor 510 and push pad switch 512 are connected to the control unit via wires and functionally interface with controller 502. If provision is made for remote control capability and an RF remote control is used, RF receiver/processor 508 might also be connected to antenna 520 via a wire or wires. The control system 500 serves to control the operation of three-phase motor 550, which is the electric motor in a door operator according to example embodiments of the invention.

In the example embodiments described herein, the control system includes components 580 to provide setup parameters to the controller. These components include potentiometers and dip switches. In one example, potentiometers are provided for hold-open torque, hold open time, closing force, obstruction sensitivity, motor delay, and the force by which the door is held closed against a doorframe. A dipswitch is provided to set the door operator for either left hand or right hand operation. Another dipswitch is provided in this example to activate or deactivate push-to-open mode. The hold-open torque is the amount of force by which the door resists movement in the open position. The hold-open time is the amount of time the door will stay open, and the obstruction sensitivity determines how hard the door will push on an obstruction when opening before stopping. In some embodiments, these input components are monitored continuously to determine the operating parameters of the door operator. However, it is possible to design an embodiment where these settings are stored in memory 554. In such an embodiment, the input components are read at start-up. It is also possible to design an embodiment where these parameters are put in memory 554 through programming interface 504 rather than input via connected components such as potentiometers or switches.

The power module of FIG. 5 provides an interface between the controller or processor and the three-phase motor. Such a power module typically provides circuit protection and includes an inverter-based power supply for the motor. A power module to drive the motor may also include under-voltage lock-out and short circuit protection. As an example, a power module that could be used with some embodiments of the invention is the FSBB15CH60C Smart Power Module manufactured by Fairchild Semiconductor Corporation of South Portland, Me., United States.

Controller 502 in this example embodiment includes a central processing unit (CPU) 552 and memory 554. Many different types of processing devices could be used to implement an embodiment of the invention, including a processor, digital signal processor, or so-called, "embedded controller." Any of these devices could include memory along with a processing core such as a CPU, or could use external memory or a combination of internal and external memory. In the illustrated embodiment the memory stores firmware or computer program code for executing a process or method on the CPU or other processor to carry out an embodiment of the invention. Such firmware or computer program code can be loaded into the control unit from an external computer system via programming interface 504. The process or method of an embodiment of the invention could also be carried out by logic circuitry, a custom semiconductor device, or a combination of such a device or circuitry with firmware or software. As previously mentioned, in some embodiments the memory could also be used to store operating parameters.

An embodiment of the invention take the form of an entirely hardware embodiment, or an embodiment that uses software (including firmware, resident software, micro-code, etc.). Furthermore, an embodiment of the invention may take the form of a computer program product on a tangible computer-usable storage medium having computer-usable program code embodied in the medium. A memory device or memory portion of a processor as shown in FIG. 5 can form the medium. Computer program code or firmware to carry out an embodiment of the invention could also reside on optical or magnetic storage media, especially while being transported or stored prior to or incident to the loading of the computer program code or firmware into a door operator. This computer program code or firmware can be loaded, as an example, through programming interface 504 of FIG. 5 by connecting a computer system or external controller to the programming interface.

Figure 6:
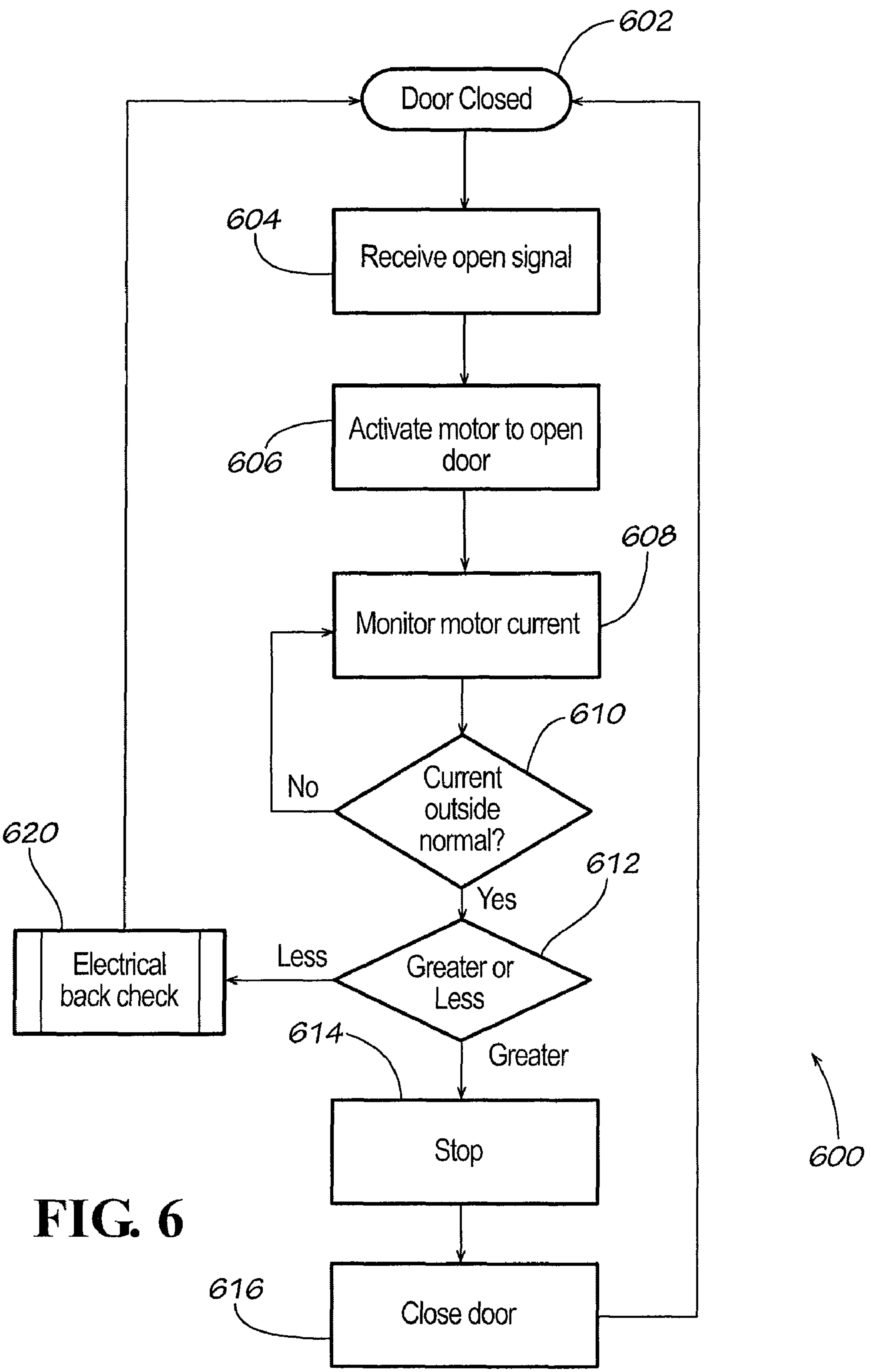
FIG. 6 is a flowchart that illustrates a portion of the method of operation of a door operator according to example embodiment of the invention, the method being carried out by the electronic control system of FIG. 5.

FIG. 6 is a flowchart that illustrates a portion of the operation of a door operator according to an embodiment of the invention. In this particular illustration, the electrical back check is used when a door operator opens the door automatically and a user also pushes on the door part way through the swing of the door. Like most flowchart illustrations, FIG. 6. illustrates process 600 as a series of process or sub-process blocks. At block 602 the door is closed. At block 604, a signal is received by the control unit to open the door. This signal may come from an RF remote control, from a push panel switch, a proximity sensor, or any other input device that allows a user to selectively activate the door operator. At block 606 the control unit activates the motor of the door operator to open the door.

Still referring to FIG. 6, at block 608 the controller in the control unit monitors the current being drawn by the motor of the door operator and at block 610 a determination is made as to whether the current being drawn by the motor is within the normal operating range of the motor. The normal operating range for the current drawn by the motor will be known in advance and programmed into the control unit as part of either the firmware that operates the controller or the operating parameters of the door operator. If the current within the normal range, monitoring continues at block 608. Otherwise, a determination is made at block 612 as to whether the current is above or below the normal operating range.

If the current drawn by the motor is greater than the normal operating current at block 612 of FIG. 6, it can be assumed that the door is meeting resistance or being pushed closed. The electric motor is stopped at block 614 and the door is closed or allowed to close at block 616. Processing then returns to block 602 where the control unit waits for another open signal. It should be noted that at bock 616, the door may be closed by activating the motor of the door operator in the other direction. The door may also be closed manually, or by causing the clutch assembly to allow a spring or other mechanical device to close the door. If the motor begins to draw less than the normal amount of current at block 612, electrical back check routine 620 is executed prior to the processing returning to block 602.

Figure 7:
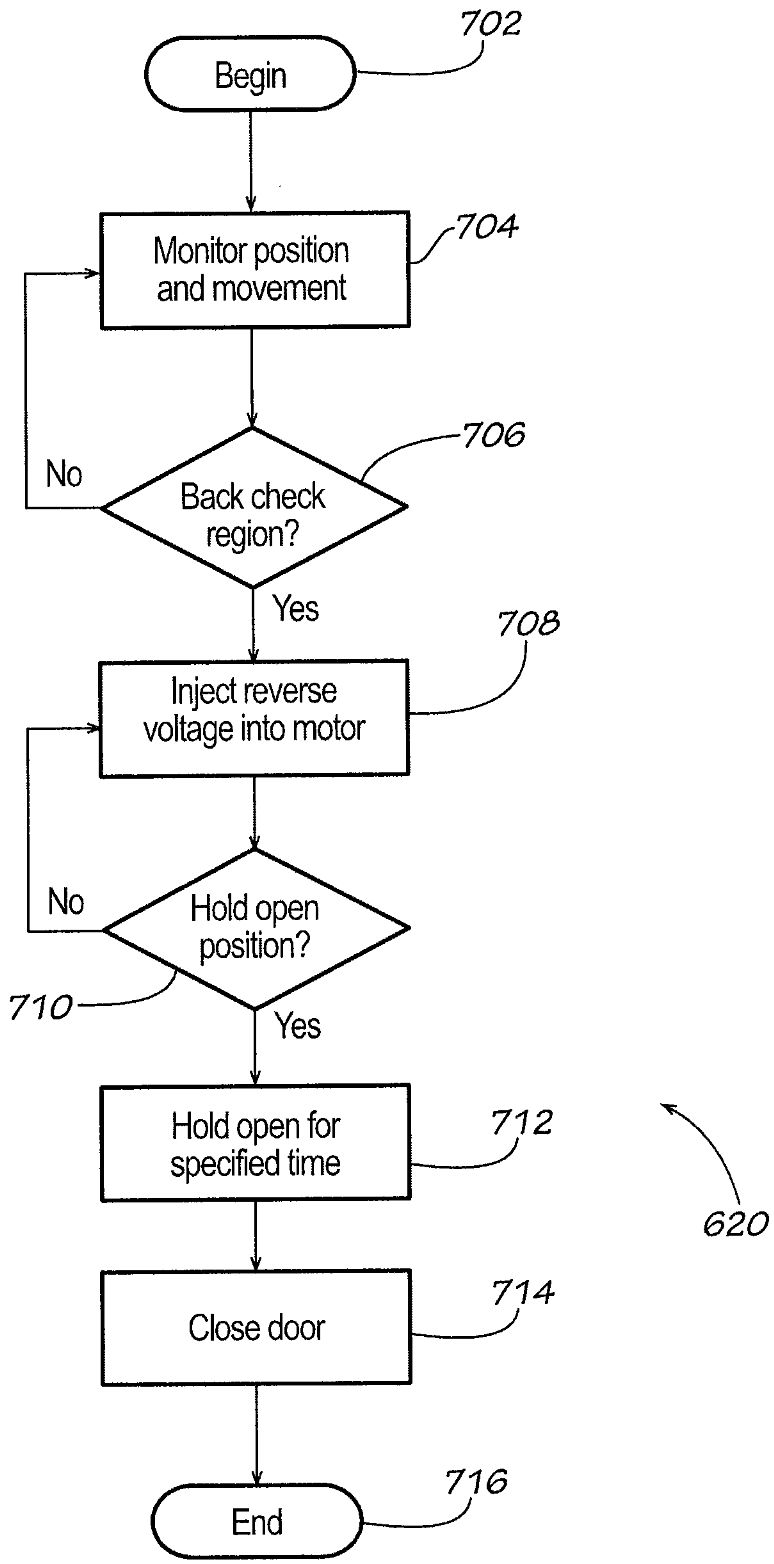
FIG. 7 is a flowchart illustrating the electrical back check portion of the flowchart of FIG. 6 in greater detail. The electrical back check in example embodiments of the invention is again carried out by the control system of FIG. 5.

FIG. 7 is a flowchart illustration of the electrical back check process 620 from FIG. 6 as executed by the controller of a door operator according to example embodiments of the invention. It should be noted that the electrical back check process of embodiments of the invention can be initiated and carried out on its own, without necessarily being triggered by the process of FIG. 6 or any other process. The back check would occur on its own, for example, in the case where a person pushes the door open without availing themselves of the door operator to open the door automatically.

Process 620 of FIG. 7 begins at block 702. At block 704, the door is being monitored to determine if it has moved into the back check region and the control unit determines when or whether the door is in the back check region at block 706. If the door is not moving through or entering the back check region of the swing at block 706, monitoring continues at block 704. Otherwise, the electrical back check is initiated at block 708 wherein the control unit causes a voltage to be injected into the electric motor. This voltage is typically of a polarity that is the reverse of the polarity that is used to open the door, or of the same as the polarity of voltage that is used to close the door if the door is operable to be closed under the power of the door operator. If the door reaches a hold open position at block 710, processing continues to block 712 where the door is held open for a specified time. The door then closes at block 714 and the process ends at block 716. If the door does not reach the hold open position but remains in the back check region at block 710, voltage injection continues at block 708.

The voltage injection in the embodiment pictured is accomplished by applying a continuous DC voltage to the motor. The level of this voltage is adjusted using the hold-open torque potentiometer. The voltage level is fixed relative to the position of the door in the pictured embodiment; however, an embodiment could be developed in which the voltage changed depending on the exact position of the door if a position sensor were included. A design could also be developed in which a pulsed voltage is used to create the electrical back check.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof. Additionally, comparative, quantitative terms such as “less” OR “greater” are intended to encompass the concept of equality, thus, “less” can mean not only “less” in the strictest mathematical sense, but also, “less than or equal to.”

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of operating a door operator using a controller and an electric motor, the method comprising:

conditionally opening a door to which the door operator is attached;

determining using a Hall effect sensor that the door to which the door operator is attached is being pushed open through a back check region;

using the controller to cause the door operator, through electronic control of the electric motor, to exert a closing force on the door by injecting voltage into the electric motor until the door comes to a stop;

conditionally preventing the opening of the door while the voltage is being injected into the electric motor; and closing the door.

2. The method of claim 1 wherein a polarity of the voltage is the same as the polarity that would close the door.

3. The method of claim 2 wherein a level of the voltage is controlled by a potentiometer.

4. A door operator comprising:

a motor;

a rotatable operator arm operatively connected between a door and the motor;

a clutch assembly conditionally, operatively engaged with the rotatable operator arm;

a Hall effect device to determine a position of the door;

a memory; and a processor operatively connected to the motor, the position sensor and the memory, wherein the processor is programmed by the memory to determine that the door is opening through the back check region and control the motor to exert a closing force on the door by injecting a voltage into the motor, and to determine if the door is being pushed open and prevent the motor from opening the door while injecting the voltage into the motor when the door is opening through the back check region.

5. The door operator of claim 4 further comprising an input device connected to the processor.

6. The door operator of claim 5 wherein the input device further comprises a wall switch.

7. The door operator of claim 6 further comprising a potentiometer operatively connected to the processor to control a level of the voltage.

8. Apparatus for operating a door, the apparatus comprising:

means for opening the door;

means for determining a position of the door;

means for exerting a closing force on the door by injecting a voltage into a motor when the door is opening through a back check region, the means for exerting the closing force responsive to the means for determining the position;

means for conditionally engaging the means for opening with the door;

means for closing the door; and means for preventing the means for opening from operating while the voltage is being injected into the motor.

9. The apparatus of claim 8 further comprising means for receiving input from a user to allow the user to selectively control the apparatus.

10. The apparatus of claim 9 further comprising means for adjusting a level of the voltage.

* * * * *